United States Patent
Brown et al.

(10) Patent No.: US 9,054,822 B2
(45) Date of Patent: Jun. 9, 2015

(54) METHOD AND SYSTEM FOR SYNCHRONIZATION OF TIME-SLOTTED BARRAGE RELAY NETWORKS

(75) Inventors: Thomas A. Brown, Cardiff by the Sea, CA (US); Thomas R. Halford, Manhattan Beach, CA (US); Mark L. Johnson, Poway, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 245 days.

(21) Appl. No.: 13/467,987

(22) Filed: May 9, 2012

(65) Prior Publication Data

US 2013/0301633 A1     Nov. 14, 2013

(51) Int. Cl.
    *H04J 3/06* (2006.01)

(52) U.S. Cl.
    CPC ............. *H04J 3/0652* (2013.01); *H04J 3/0638* (2013.01); *H04J 3/0647* (2013.01); *H04J 3/0641* (2013.01)

(58) Field of Classification Search
    CPC ..... H04J 3/0641; H04J 3/0655; H04J 3/0644; H04J 3/0658; H04J 3/0638; H04J 3/0652
    USPC ......... 370/321, 347, 350, 354, 503, 507–514, 370/338, 304, 311, 324
    See application file for complete search history.

(56) References Cited

U.S. PATENT DOCUMENTS

| | | | |
|---|---|---|---|
| 6,690,657 B1 | 2/2004 | Lau et al. | |
| 7,349,362 B2 * | 3/2008 | Belcea | 370/321 |
| 7,409,022 B2 * | 8/2008 | Dai et al. | 375/354 |
| 7,672,277 B2 | 3/2010 | Qiao | |
| 8,374,163 B2 * | 2/2013 | Horn et al. | 370/347 |
| 8,457,104 B2 * | 6/2013 | Chowdhary et al. | 370/350 |
| 2004/0128091 A1 * | 7/2004 | Delin et al. | 702/75 |
| 2008/0107044 A1 | 5/2008 | Blair et al. | |
| 2009/0313528 A1 | 12/2009 | Chugg et al. | |
| 2009/0323669 A1 * | 12/2009 | Salonidis et al. | 370/350 |
| 2010/0014460 A1 * | 1/2010 | Shin et al. | 370/328 |
| 2011/0170465 A1 * | 7/2011 | Tavildar et al. | 370/311 |
| 2011/0268139 A1 * | 11/2011 | Caracas et al. | 370/503 |
| 2013/0051381 A1 * | 2/2013 | Bracha | 370/338 |

OTHER PUBLICATIONS

Office Action mailed Aug. 27, 2012 in U.S. Appl. No. 11/833,113, 24 pages.
Chlamtac, M. Conti, et al, "Mobile ad hoc networking: Imperatives and challenges," Ad Hoc Networks, vol. 1, 2003, pp. 13-64.
Akyildiz, F., Wang, X, et al., "Wireless mesh networks: A survey," Computer Networks, vol. 47, 2005, p. 445-487.
Akyildiz, F., Su, W., et al., "Wireless sensor networks: A survey," Computer Networks, vol. 38, 2002, pp. 393-422.

(Continued)

*Primary Examiner* — Candal Elpenord
*Assistant Examiner* — Harun Chowdhury
(74) *Attorney, Agent, or Firm* — Kilpatrick Townsend & Stockton LLP

(57) ABSTRACT

Systems and methods are presented for establishing network-wide time synchronization in a time-slotted barrage relay network. In the first phase, nodes obtain coarse, slot-level time synchronization by estimating the time-of-arrival (TOA) of a message that rapidly floods the network via the barrage relay mechanism. In the second phase, fine time synchronization is achieved via a messaging protocol that exchanges TOA information between neighboring nodes.

20 Claims, 4 Drawing Sheets

(56) References Cited

OTHER PUBLICATIONS

Sivrikaya, F., et al., "Time synchronization in sensor networks: A survey," IEEE Network, vol. 18, No. 4, 2004, pp. 45-50.

Ganeriwal, S., et al., "Time-sync protocol for sensor networks," in Proc. ACM Conf. on Embedded Networked Sensor Systems (SenSys), Los Angeles, Nov. 2003, 13 pages.

Tanenbaum, S., et al., Computer Networks (5th ed.). Prentice Hall, 2011, title page, table of contents, 13 pages.

Mills, D. L., "Internet time synchronization: The network time protocol," IEEE Transactions on Communications, vol. 39, No. 10, 1991, pp. 1482-1493.

Halford, T.R., et al., "Barrage Relay Networks," in Proc. UCSD Information Theory and Applications Workshop, La Jolla, CA, 2010, 8 pages.

Bao, L., et al., "A new approach to channel access scheduling for ad hoc networks," in Proc. ACM 7th Annual International Conference on Mobile Computing and Networking, Rome, Jul. 2001, 11 pages.

* cited by examiner

METHOD AND SYSTEM FOR SYNCHRONIZATION OF TIME-SLOTTED BARRAGE RELAY NETWORKS

CROSS-REFERENCES TO RELATED APPLICATIONS

The application is related to commonly assigned U.S. patent application Ser. No. 11/833,113, filed on Aug. 2, 2007, titled "Methods and Apparatus for Network Communication Via Barrage Relay Onto an Independent Medium Allocation," by Blair et al. which is incorporated by reference in its entirety herein for all purposes.

FIELD OF THE INVENTION

The present invention relates to systems and methods for establishing a common time reference in a wireless communications network.

BACKGROUND

Many network architectures depend on a common, network-wide time reference. Network-wide time references may be provided by an external source where available, for example, on-board Global Positioning System (GPS) receivers may provide a network-wide time reference. However, some applications and environments do not allow network timing through the use of GPS. For example, sensor networks are often deployed in tunnels, caves, or underneath dense foliage. Accordingly, there is a need for synchronization of time in the absence of external time references.

SUMMARY

Embodiments of the present invention include methods and systems for achieving synchronization in a time-slotted barrage relay network (BRN). In the first phase, nodes obtain coarse, slot-level time synchronization by estimating the time-of-arrival (TOA) of a message that rapidly floods the network via the barrage relay mechanism. In the second phase, fine time synchronization may be achieved via a messaging protocol that exchanges TOA information between neighboring nodes.

For example, in one embodiment, a method for synchronizing a time reference of a node in a time-slotted barrage relay network includes receiving a first coarse synchronization message from a source node on a first logical channel. The node may adopt a TDMA frame format that is described in the coarse synchronization message and adjust a local clock by the estimated time of arrival of the message from the source node. Accordingly, the node has achieved a coarse, slot-level synchronization with the source node. The method further includes receiving a second coarse synchronization message from the source node on the first logical channel. The node may then relay the second coarse synchronization to neighboring nodes, receive a fine synchronization message on a second logical channel, and adjust its local clock using time of arrival information contained in the fine synchronization message.

In another embodiment, a method for synchronizing a node in a time-slotted barrage relay network comprises waiting a predetermined amount of time to receive a preexisting coarse synchronization message. However, if no coarse synchronization message is received, the node may attempt to become a source or network time reference ("NTR") node for a newly generated network. The node may become a source or NTR node by generating and transmitting a first and second coarse synchronization message on a first logical channel.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

DETAILED DESCRIPTION

Synchronization in Ad Hoc Wireless Networks

Figure 1:
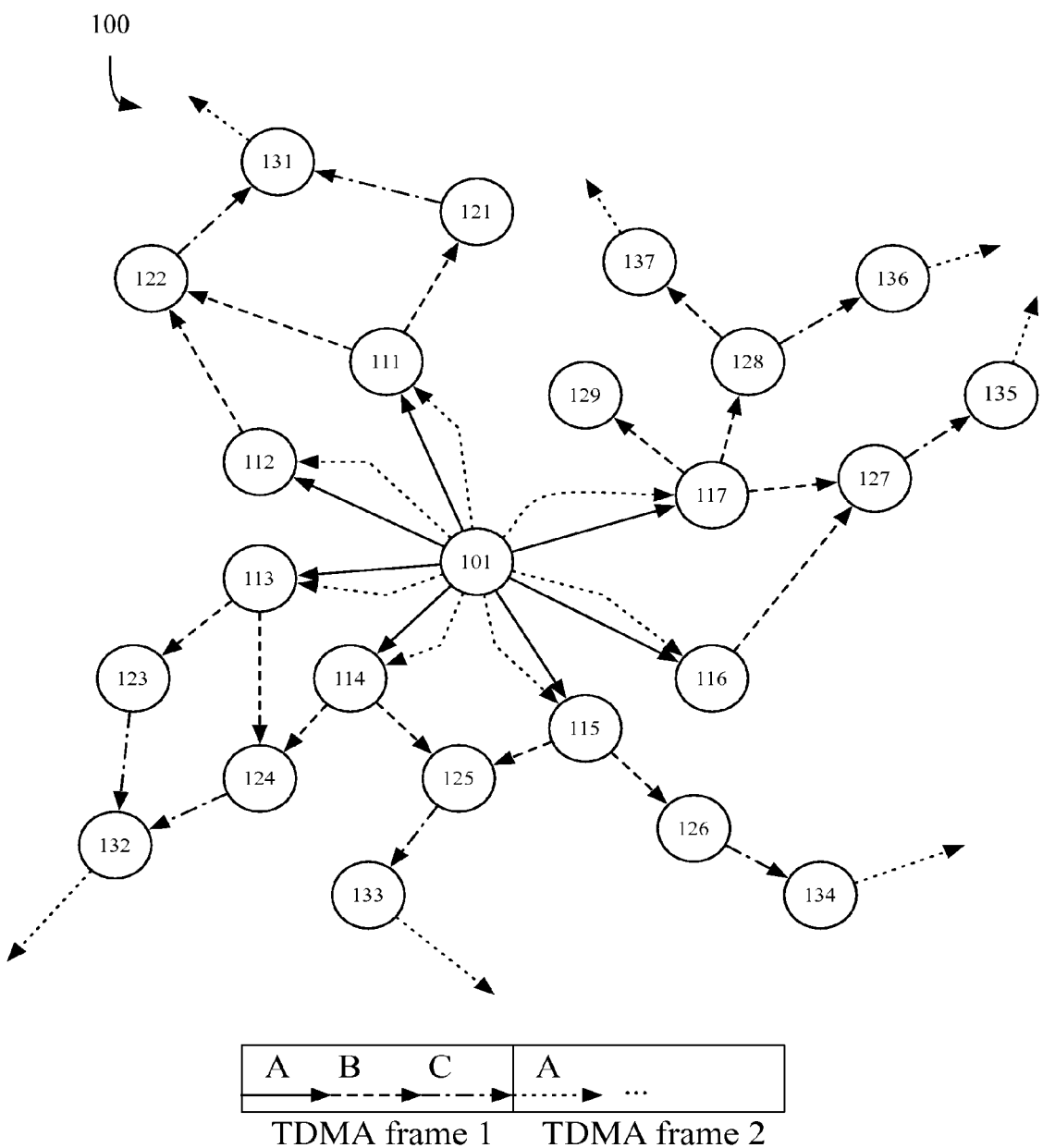
FIG. 1 shows an illustrative broadcast flooding protocol for barrage relay networks, according to one embodiment of the present invention.

Ad hoc wireless networks are the focus of considerable research and development. A number of different classes of ad hoc networks have been identified including: (i) mobile ad hoc networks, see, e.g. I. Chlamtac, et al., "Mobile ad hoc networking: Imperatives and challenges," Ad Hoc Network's, Vol. 1, no. 1, pp. 13-64, July 2003, (ii) wireless mesh networks, see, e.g., I. F. Akyildiz, et al., "Wireless mesh networks: A survey," Computer Networks, vol. 47, 2005, p. 445-487, and (iii) wireless sensor networks, see, e.g., I. F. Akyildiz, et al., "Wireless sensor network: A survey," Computer Networks, vol. 38, 2002, pp. 393-422.

Ad hoc wireless networks can be distinguished from other type of wireless networks—such as satellite, cellular, and Wireless Local Area Networks (WLANs)—by a lack of dependence on fixed infrastructure. If a source node wishes to send data to a distinct destination node (or plurality of nodes), but cannot do so via a direct link (due to, for example, a large spatial separation between the source and destination nodes), then a multi-hop communication link can be established through a plurality of intervening nodes that provide a relay function. A key distinguishing feature of ad hoc networks is that at any given time, any given node can act as a source, destination, or relay for any given data transmission.

Many ad hoc wireless network architectures depend on a common, network-wide time reference, see, e.g., F. Sivrikaya and B. Yener's, "Time synchronization in sensor networks: A survey," in Proc. ACM Conf. on Embedded Networked Sensor Systems (SenSys), Los Angeles, November 2003. In ad hoc wireless networks employing Time-Division Multiple Access (TDMA) methods for channel access, time synchronization is especially important since nodes coordinate transmission and reception within specific time windows (i.e., time slots).

If every node in the network has access to an external time reference—from, for example, on-board Global Positioning System (GPS) receivers—then establishing and maintaining network-wide time synchronization is trivial. In many ad hoc wireless network applications, however, GPS access cannot be assumed. For example, sensor networks are often deployed in tunnels, caves, or underneath dense foliage. Furthermore, military mobile ad hoc network systems cannot rely on civilian GPS as it is readily spoofed; and the Selective Availability Anti-Spoofing Modules (SAASM) used to provide military-grade GPS are too bulky for use in handheld radios. Methods for synchronization in the absence of external time references are thus a critical component of many ad hoc wireless network architectures.

Time-Slotted Barrage Relay Networks

Embodiments of the present invention concern time synchronization in a specific class of ad hoc wireless networks: Barrage Relay Networks (BRNs). BRNs are distinguished from other wireless networking architectures by their use of an efficient protocol for broadcasting information throughout a network via a flooding mechanism that exploits cooperative communications at the physical layer. In particular, this cooperative scheme may be completely autonomous in that nodes need not coordinate explicitly; rather, cooperative behavior emerges implicitly via intelligent signal design techniques.

FIG. 1 illustrates a small ad hoc wireless network. A common TDMA format can be employed by all nodes in which time may be divided into frames, which are further divided into M slots per frame (FIG. 1 employs 3 slots per frame labeled "A," "B," and "C"). The value of M may be denoted the "spatial pipelining factor." The data that is transmitted in a given time slot is denoted a "message." Two messages that are transmitted by two different nodes are said to be identical if all data—including all protocol header information—contained in the respective messages is identical.

Suppose the central node 101 transmits a message on slot A of the first TDMA frame. All nodes that successfully receive this message are, by definition, one hop away from the source. These nodes are labeled 111, 112, . . . , 117 in FIG. 1. These nodes transmit the same message on slot B, thus relaying to nodes that are 2 hops away from the source (nodes 121, 122, . . . , 129), which in turn transmit the same message on slot C. Nodes that are 3 hops away from the source (nodes 131, 132, . . . , 137) relay the message on slot A of the second TDMA frame. In this way, messages may be transmitted outward from the source via a decode-and-forward approach.

To prevent the relay transmissions from propagating back towards the source, each node may relay a given message only once. For example, one-hop nodes receive the first broadcast message on slot A (from the source) and again on slot C (from 2-hop nodes) but only relay on slot B.

In some embodiments a number of two-hop nodes in FIG. 1 may receive the same message from different one-hop nodes during the same time slot. These messages do not collide due to the physical (PHY) layer processing employed by BRNs. Specifically, BRNs employ a PHY layer that allows identical messages to be combined at the receiver in a manner analogous to multipath mitigation in traditional radio receivers. That is to say, the multiple, time-shifted copies of the received signal that arise in BRNs can be interpreted at the receiver as resulting not from different transmitting nodes, but from reflections off, for example, buildings when a single source transmits. One possible, but by no means unique, method for designing signals that support such combining of identical messages was described in U.S. patent application Ser. No. 12/245,993, filed Oct. 6, 2008, titled "A Method and System for Cooperative Communications with Minimal Coordination."

In order for two messages to be identical, both the payload data and all protocol header data must be identical. Therefore, protocol headers in a BRN can only be modified in a manner that is common across all nodes at a given hop distance from the source. For example, a Hop Count (HC) field can be embedded in a protocol header which is incremented upon relay. In this manner, all nodes that receive a message can ascertain their distance (in hops) from the initial message source node. Moreover, a HC field can also be combined with a time-to-live (TTL) field in order to limit the extent of a transmission in a BRN.

In some embodiments the spatial reuse of time slots enables messages to be pipelined into the source for transmission every three slots. Specifically, in FIG. 1, the one-hop nodes will not receive the message broadcast by the three-hop nodes during slot A of the second TDMA frame. Thus, the source can safely transmit a second message during that slot. In this manner, a throughput of W/3 can be achieved for broadcast in a single-source BRN (W is the capacity of a single point-to-point link). We denote this efficient injection of messages for transmission "spatial pipelining" in order to highlight its reuse of time slots between spatially separated nodes.

More generally, spatial pipelining can be achieved by having a source node inject a new message for barrage relay broadcast every M slots resulting in a throughput of W/M. It is readily seen that for arbitrary networks (i.e., where the size of the network is unknown to the source a priori), M must be at least 3 to avoid collisions. Larger spatial pipelining factors may be chosen in order to enhance robustness in highly mobile network topologies.

Because time-slotted BRNs employ a common TDMA frame format at all nodes, the time slots that comprise a given frame can be allocated to different network services. For example, certain slots may be devoted to the transmission of data and other slots to push-to-talk (PTT) voice. The slots comprising a single service form a TDMA Logical Channel (LC). In this case, the basic barrage relay protocol described above operates on a single LC: a message received in a time slot assigned to a given LC is relayed on the next time slot that is assigned to that same LC.

Synchronization with a Pre-Assigned Network Time Reference Node

The synchronization protocol disclosed herein operates on two logical channels. Coarse, slot-level synchronization is achieved via the network-wide broadcast of messages on the Coarse Synchronization Logical Channel (CS-LC). Fine synchronization is achieved via messages that are transmitted with a time-to-live (TTL) of one hop on the Fine Synchronization Logical Channel (FS-LC). The protocol is first described assuming that a unique pre-assigned node is to provide the network time reference (NTR) with which all other nodes synchronize. This NTR node may also be referred to interchangeably in this application as a "source" node. Modifications to the protocol that support fully autonomous operation (i.e., no pre-specified NTR) are then described.

The protocol may be initiated by the pre-specified NTR node, which may transmit a message on a time slot assigned to the CS-LC containing: (i) a Hop Count (HC) field that is incremented upon relay, (ii) a Unique Identifier (UID) for the NTR, and (iii) a description of the TDMA frame format that will be used by the network.

In particular, the TDMA frame format defines which time slots will be assigned to the CS-LC, which time slots will be assigned to the FS-LC, and the spatial reuse factor M to be used for broadcasting on the CS-LC. A node that receives this message may not relay it, but instead may adjust its local clock per the description below and adopt the TDMA frame format described within it.

Suppose that a given Node X separated from the NTR by a distance corresponding to α seconds of propagation time receives this message. Node X adjusts its local clock so that the boundary between time slots in the TDMA frame is aligned with the message's time-of-arrival (TOA). If the absolute time is t, the local time at Node X, ($T_X(t)$), is related to the local time at the NTR node, ($T_{NTR}(t)$), by:

$$T_X(t)=T_{NTR}(t)-\alpha \quad (1)$$

Following the transmission of the first message on the CS-LC, all nodes that are one-hop neighbors of the NTR achieve coarse synchronization with the NTR. That is to say, the primary source of offset between any one-hop neighbors of the NTR corresponds to the relative difference in distance to the NTR.

A second message that is identical to the first message may be broadcast M time slots after the first message by the NTR on the CS-LC. As the neighbors have now joined the network, the neighbors of the NTR may relay this packet and it may be received by (but not relayed by) nodes that are two hops away from the NTR. These 2-hop nodes may adjust their local clocks so as to align with the respective TOAs of the received message and may adopt the TDMA frame format described within the message.

A third message may then be broadcast by the NTR 2M CS-LC time slots after the first which may be relayed by the NTR's 1-hop neighbors, relayed subsequently by its 2-hop neighbors, and finally used by nodes that are three hops from the NTR to achieve coarse synchronization.

This protocol continues so that after M×L CS-LC time slots, all nodes within L+1 hops of the NTR achieve coarse synchronization.

In some embodiments, the HC field of messages received on the CS-LC can be used by nodes to ascertain their distance in hops away from the NTR. The protocol in embodiments of the present invention couples level discovery (each nodes distance in hops from the NTR) with coarse time synchronization. Further, the amount of time required by embodiments of the present invention to complete coarse time synchronization grows linearly with hop radius of the network, which will typically be much smaller than the number of nodes in the network.

In some embodiments of the invention nodes can continue to measure the TOA of messages received on the CS-LC after coarse time synchronization has been achieved. In one embodiment of the invention, subsequent message TOAs drive a tracking loop that is used to filter out noise in the TOA measurements over time.

Once a node achieves coarse time synchronization with the NTR, it may be permitted to transmit and receive messages on the FS-LC. The present invention is disclosed without regard to the specific protocol used to coordinate access to the FS-LC. In one embodiment of the invention, nodes transmit messages on the FS-LC with a fixed probability p so that collisions between different messages may occur. In another embodiment of the invention, the transmission probability at a given node may be determined as a non-increasing function of the size of its one-hop neighborhood so as to decrease the probability of collision. In yet another embodiment of the invention, collisions may be suppressed by using a contention access method such as the Node Activation Multiple Access (NAMA) protocol, which is described in L. Bao and J. J. Garcia-Luna-Aceves, "A new approach to channel access scheduling for ad hoc networks," in *Proc. ACM 7th Annual International Conference on Mobile Computing and Networking*, Rome, July 2001.

Whenever a message may be received on the FS-LC, the TOA of that message as well as the UID of the message's transmitter may be recorded in a table. Messages that are transmitted on the FS-LC may contain: (i) the UID of the transmitter, and (ii) a list of (UID, TOA) measurement pairs that have been previously obtained upon reception of FS-LC messages by the transmitting node.

Suppose that a Node X located h hops from the source receives a message from Node Y that is located h−1 hops from the source. Let the TOA of this message be μ seconds (relative to the local time slot boundary of Node X). Suppose further that the message from Node Y contains a TOA measurement of v from Node X. The TOA measurement of v from Node X may be determined previously by Node Y. The clock offset between Nodes X and Y can be estimated as:

$$\varepsilon = \frac{\mu - v}{2} \quad (2)$$

Assuming that there was no relative motion between Nodes X and Y in the period separating the forward and reverse TOA measurements, this estimate can be precise (up to noise in the TOA measurement).

In some embodiments nodes may only make fine adjustments of their local clocks to match those nodes that are closer (in hops) to the NTR node. Each node may be aware of its position relative to its neighbors based on the stored hop count from the course synchronization message. In this manner, the network will converge to synchronize with the pre-assigned NTR.

Additionally, in some embodiments, a Node X may have the opportunity to adjust its local clock any time a message may be received on the FS-LC such that: (i) the transmitting node is closer to the NTR (in hops) than X, and (ii) the message contains a TOA measurement from Node X. Furthermore, in one embodiment of the invention, the local time adjustments may drive a tracking loop that may be used to filter out noise in the TOA measurements over time.

Embodiments of the present invention may not explicitly perform two way messaging. When a message is transmitted on the FS-LC, a plurality of nodes can potentially make local clock adjustments based on the content of that message.

Figure 2:
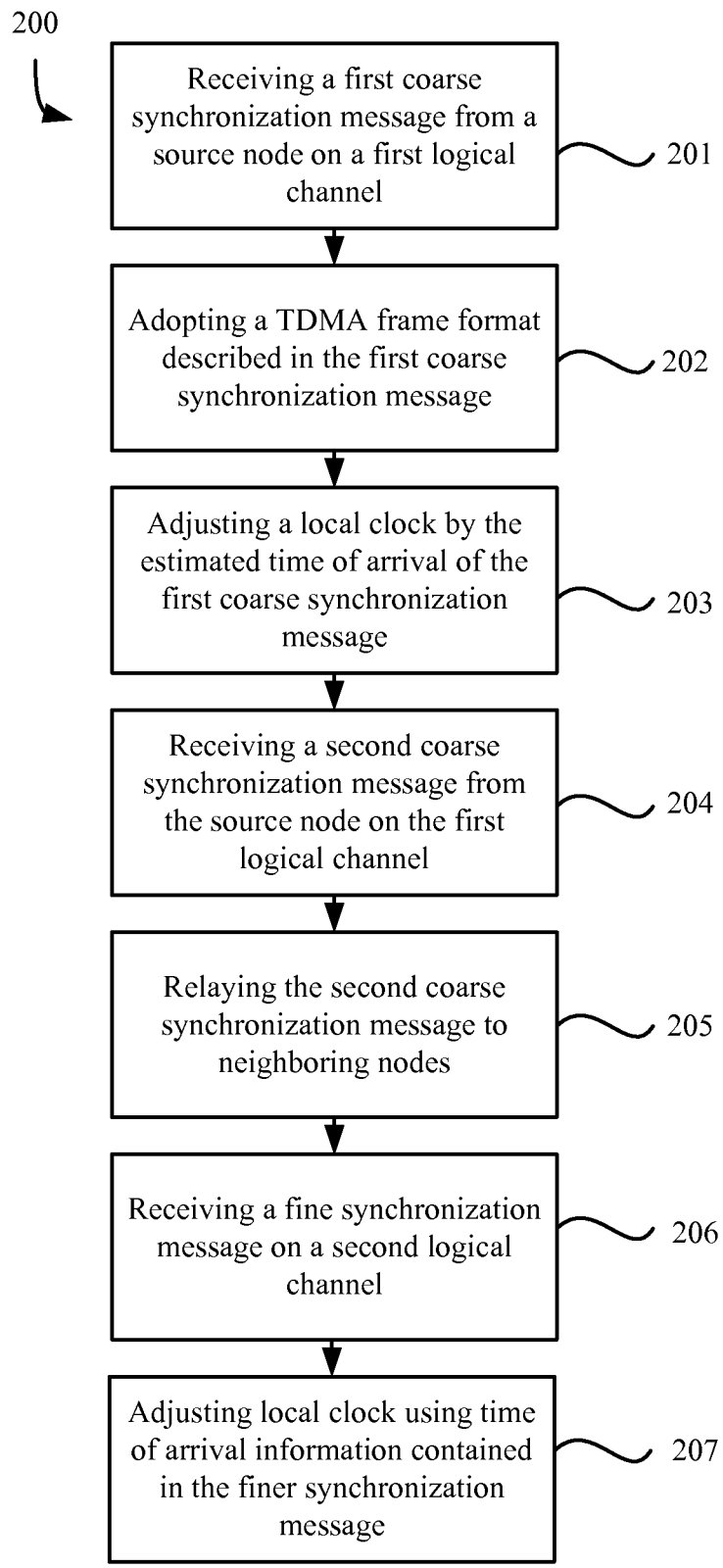
FIG. 2 is a flow chart for a method of synchronizing nodes in a time-slotted barrage relay network, according to one embodiment of the present invention.

FIG. 2 is a flow chart for a method of synchronizing nodes in a time-slotted barrage relay network, according to one embodiment of the present invention. In some embodiments, the order of steps in flow chart 200 may be changed. Further, some of the steps shown in flow chart 200 may be skipped or additional steps added.

As shown in FIG. 2, the method 200 begins at 201 when a node receives a first coarse synchronization message from a source node on a first logical channel. In one embodiment, the first coarse synchronization message may comprise a hop count (HC) field that is incremented upon relay, a unique identifier for the source node, and a description of the TDMA frame format that may be used by the network. In one embodiment, the first logical channel may be dedicated to transmitting coarse synchronization messages and may be referred to as the coarse synchronization logical channel (CS-LC).

In step 202, the receiving node adopts the TDMA frame format described in the first coarse synchronization message. The TDMA frame format defines which time slots will be assigned to the first logical channel, the second logical channel, and the spatial reuse factor to be used for broadcasting on the different logical channels.

In step 203, the node adjusts a local clock by the estimated TOA of the first coarse synchronization message. The receiving node estimates the TOA of the first coarse synchronization message in seconds and adjusts or offsets its local clock so that the boundary between time slots in the TDMA frame may be aligned with the coarse synchronization message's TOA. Once the receiving node adopts the TDMA frame format and adjusts its local clock, the receiving node is considered to have achieved coarse time synchronization with the source or NTR node.

In step 204, the node may receive a second coarse synchronization message from the source node on the first logical channel. In some embodiments, the first and second coarse synchronization messages may be identical. Additionally, in some embodiments, the second coarse synchronization message may be received at the next occurrence of the CS-LC because the NTR or source node may send a coarse synchronization message every time the first logical channel or CS-LC is repeated. Therefore, the coarse synchronization messages may be separated by a time period equal to one frame and accordingly, the source node or NTR node may transmit an identical coarse synchronization message every frame.

In step 205, the receiving node relays the second coarse synchronization message to neighboring nodes. Now that the receiving node has achieved coarse synchronization and has joined the network of the source or NTR node, the receiving node receives the second coarse synchronization message and relays the message to its neighboring nodes. Additionally, before relaying the second coarse synchronization message, the receiving node increments the hop count field such that any neighboring nodes receiving the relayed second coarse synchronization message knows the number of hops to the source or NTR node. The neighboring nodes that receive the second coarse synchronization message on the first logical channel may then undergo a similar procedure as the receiving node and join the network of the source node.

In step 206, the receiving node may receive a fine synchronization message on a second logical channel. In one embodiment, the fine synchronization message may have a time-to-live (TTL) of 1 hop and thus can only be received by directly neighboring nodes of the transmitting node. Furthermore, in one embodiment the fine synchronization message comprises the unique identifier of the transmitting node and TOA information. The TOA information may comprise a list of unique identifiers and TOA measurement pairs that have been previously obtained upon reception of prior fine synchronization messages on the second logical channel by the transmitting node. Additionally, in some embodiments, the receiving node may record the TOA of the message as well as the unique identifier of the transmitting node in a TOA information table. The receiving node may include the TOA information table in any fine synchronization messages the receiving node subsequently transmits.

Finally, in step 207, the receiving node may adjust its local clock using the TOA information contained in the fine synchronization message. When the receiving node recognizes their own unique identifier in the TOA information contained in the fine synchronization message, the receiving node may use the measured TOA corresponding to their own unique identifier from the list contained in the fine synchronization message to determine the adjustment necessary. The receiving node may also calculate the TOA of the fine synchronization message. The receiving node may then determine an estimated adjustment by dividing the difference between the calculated TOA and the measured TOA from the list in the fine synchronization message by two. Accordingly, the receiving node may adjust their local clock whenever a fine synchronization message is received in which the unique identifier of the receiving node has a measured TOA in the list of measurement pairs in the fine synchronization message. Additionally, in some embodiments, the fine synchronization adjustments may further be limited to fine synchronization messages that are received from transmitting nodes that have a smaller hop count field than the receiving node.

Accordingly, the coarse synchronization messages can spread across a number of nodes and create a network of time-slotted barrage relay network nodes with a network-wide clock that is synchronized with a source or NTR node. However, in some embodiments, there may not be a predetermined NTR node that organizes and synchronizes surrounding nodes.

Synchronization without a Pre-Assigned Network Time Reference Node

In one embodiment, there may be no pre-assigned network time reference (NTR). In such a network, upon powering up, nodes wait a random amount of time to receive a coarse synchronization message from an existing network. If no such message is received, a node may attempt to become the NTR for its own network.

Furthermore, in one embodiment, networks with distinct NTRs can merge to form a large network with a single NTR. Suppose that Node X is synchronized to Network 1, whose NTR is identified by $UID_1$. When not actively demodulating a message transmitted by a node in Network 1, Node X may constantly attempt to receive a message coarse synchronization message from any nearby nodes. If such a message is received from a node in Network 2, whose NTR is identified by $UID_2$, then Node X may decide whether to remain synchronized with Network 1 or to instead synchronize with Network 2. To this end, a common prioritization scheme may be employed at nodes. For example, in one embodiment of the invention, Node X may join Network 2 if and only if $UID_2<UID_1$. Other embodiments may implement other common prioritization schemes as would be recognized by one of ordinary skill in the art.

Figure 3:
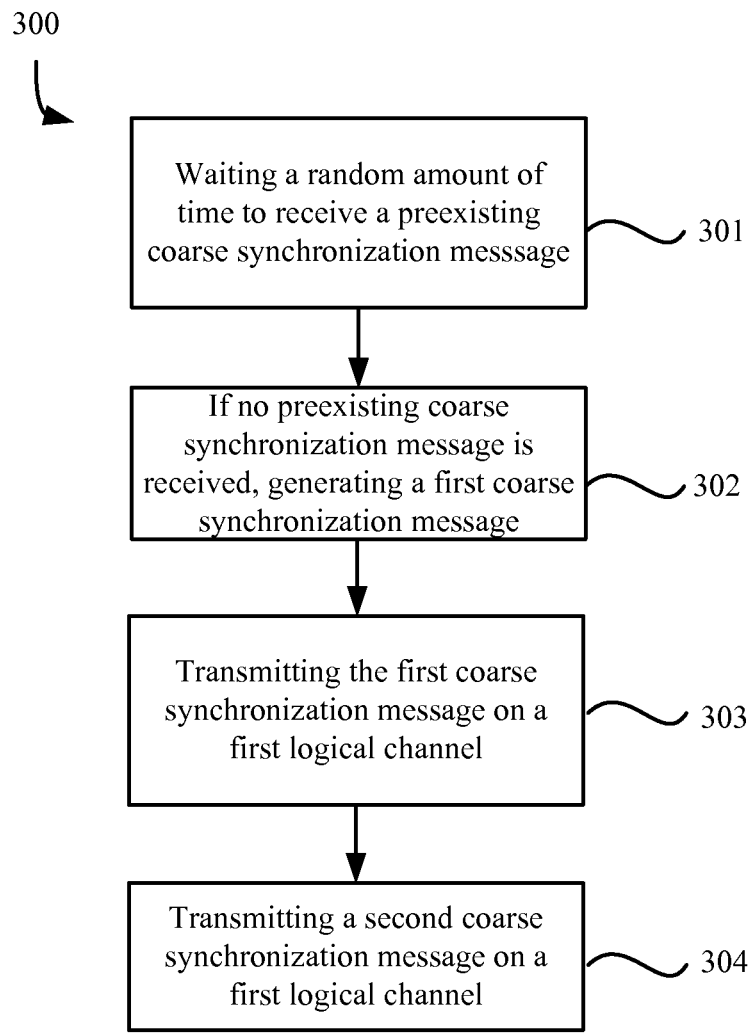
FIG. 3 is a flow chart for a method of synchronizing a time reference of at least one node in a time-slotted barrage relay network, according to one embodiment of the present invention.

FIG. 3 is a flow chart for a method of synchronizing at least one node in a time-slotted barrage relay network without a pre-assigned NTR node, according to one embodiment of the present invention. In some embodiments, the order of steps in flow chart 300 may be changed. Further, some of the steps shown in flow chart 300 may be skipped or additional steps added.

In step 301, a node that has not achieved coarse synchronization with a preexisting network waits for a random amount of time to receive a preexisting coarse synchronization message. In some embodiments, this amount of time may be random or predetermined. Additionally, it may be possible in some embodiments to build a conditional trigger or other rule to allow a node to drop out of a preexisting network if the condition is met.

In step 302, if the node does not receive a preexisting coarse synchronization message within the random or predetermined amount of time, the node may generate a first coarse synchronization message. The first coarse synchronization message may contain a default TDMA frame format or the node may generate a new TDMA frame format. The TDMA frame format can be described in the first coarse synchronization message and the first coarse synchronization message may further comprise a hop count (HC) field that can be incremented upon relay and a unique identifier for the node. In some embodiments, the description of the TDMA frame format may define the number of logical channels and may determine which logical channels (if any) will be dedicated to particular types of messages.

In step 303, the node transmits the first coarse synchronization message on a first logical channel. The first logical channel is defined in the description of the TDMA frame format. Accordingly, any neighboring nodes within transmission power of the node may receive the first coarse synchronization message and may achieve coarse time synchronization with the transmitting node according to the method as described above in reference to FIG. 2.

Finally, in step 304, the node may generate and transmit a second coarse synchronization message on the first logical channel. The node may continue to generate coarse synchronization messages. Accordingly, the node may attempt to become the NTR or source node for a new network. Additionally, a neighboring node may receive two different coarse synchronization message from different source or NTR nodes. In some embodiments, a common prioritization scheme may be implemented such that a neighboring node that is already a member of a node may determine whether to join a different network.

Figure 4:
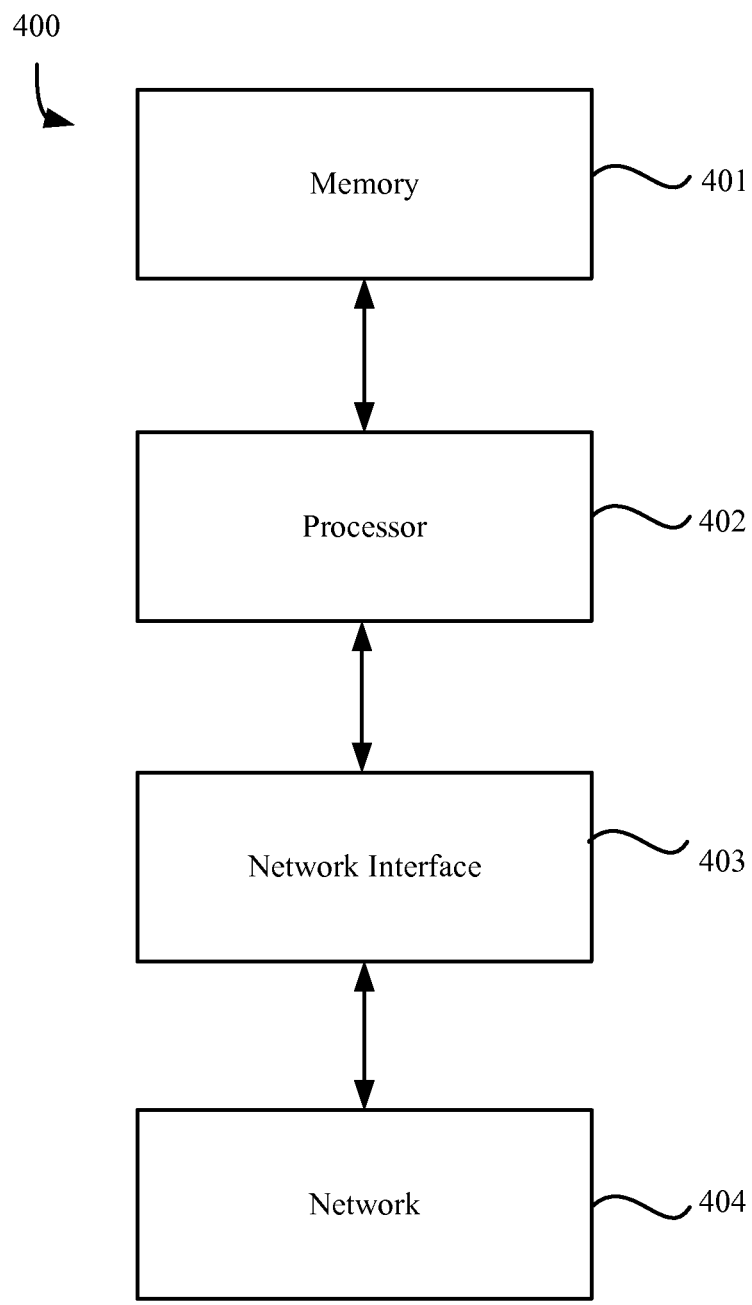
FIG. 4 is a block diagram of a system for synchronizing a time reference for a node in a time-slotted barrage relay network, according to one embodiment of the present invention.

FIG. 4 is a block diagram of a device implemented as a node for network-wide synchronization in time slotted barrage relay networks according to one embodiment of the present invention. As shown in FIG. 4, the system 400 comprises a memory 401, a processor 402, a network interface 403, and a network 404.

The processor 402 is configured to execute computer-executable program instructions stored in memory 401. For example, processor 402 may execute one or more computer programs for network-wide synchronization in time slotted barrage relay networks in accordance with embodiments of the present invention. Processor 402 may comprise a microprocessor, a digital signal processor (DSP), an application-specific integrated circuit (ASIC), one or more field programmable gate arrays (FPGAs), state machines, or the like. Processor 402 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 401 comprises a computer-readable medium that stores instructions that when executed by processor 402, cause processor 402 to perform various steps, such as those described herein. Examples of computer-readable media include, but are not limited to, an electronic, optical, magnetic, or other storage or transmission devices capable of providing processor 402 with computer-readable instructions. Other examples of computer-readable media comprise, but are not limited to, a floppy disk, CD-ROM, magnetic disk, memory chip, ROM, RAM, ASIC, configured processor, all optical media, all magnetic tape or other magnetic media, or any other medium from which a computer processor can access data. In addition, various other devices may include computer-readable media such as a router, private or public network, or other transmission devices. The processor 402 and the processing described may be in one or more structures, and may be dispersed throughout one or more structures.

Processor 402 is in communication with the network interface 403. The network interface 403 may comprise one or more network connections. Network interface 403 connects processor 401 to network 404. Network 404 may be one of many types of networks known in the art. For example, network 404 may comprise a wired or wireless network, such as a BRN.

General Considerations

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor.

While the present subject matter will be described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method of synchronizing a time reference for a first node of a plurality of nodes in a time-slotted barrage relay network, the method comprising:
   at the first node:
      receiving a first coarse synchronization message from a source node, the first coarse synchronization message comprising a description of a TDMA frame format, wherein the first coarse synchronization message is not relayed by the first node;
      adopting the TDMA frame format of the first coarse synchronization message;
      achieving coarse synchronization by adjusting a local clock by an estimated time of arrival of the first coarse synchronization message; thereafter
      receiving a second coarse synchronization message from the source node on a first logical channel that is defined by the TDMA frame format of the first coarse synchronization message;
      relaying the second coarse synchronization message to at least one neighboring node of the plurality of nodes on the first logical channel, wherein the relayed second coarse synchronization message and subsequently relayed coarse synchronization messages enable each of the plurality of nodes to achieve coarse synchronization in a period of time proportional to a hop radius of the time-slotted barrage relay network;
      receiving a fine synchronization message comprising time of arrival information on a second logical channel that is defined by the TDMA frame format of the first coarse synchronization message; and
      adjusting the local clock using the time of arrival information of the fine synchronization message.

2. The method of claim 1, wherein the first coarse synchronization message and the second coarse synchronization message are both identical and both transmitted by the source node in adjacent frames.

3. The method of claim 1, wherein the first coarse synchronization message further comprises:
   a hop count field that is incremented upon relay; and
   a unique identifier for the source node.

4. The method of claim 1, wherein the first coarse synchronization message is relayed by at least one of the plurality of nodes other than the source node before being received by the first node.

5. The method of claim 1, wherein the time of arrival information of the fine synchronization message comprises:
   a unique identifier for a transmitting node; and
   a list of time of arrival measurements and corresponding unique identifiers for one or more prior fine synchronization messages received by the transmitting node.

6. The method of claim 5, wherein the first node only adjusts the local clock using the time of arrival information of the fine synchronization message when the transmitting node is closer in hop count to the source node than the first node and the fine synchronization message contains a time of arrival measurement from the first node.

7. The method of claim 5, wherein the step of adjusting the local clock using the time of arrival information of the fine synchronization message further comprises:
   determining the time of arrival, p, of the fine synchronization message in seconds;
   determining the time of arrival measurement, v, from the list of time of arrival measurements in seconds that corresponds to the unique identifier of the first node; and
   adjusting the local clock offset, $\epsilon$, according to $$\varepsilon = \frac{\mu - v}{2}$$

seconds.

8. The method of claim 1, wherein the local clock adjustments drive a tracking loop that is used to filter out noise in the time of arrival measurements over time.

9. The method of claim 1, wherein the fine synchronization message is received by multiple of the plurality of nodes each of which adjust its local clock.

10. The method of claim 1, wherein the first node cannot transmit or receive the fine synchronization message unless the first node has adopted the TDMA frame format of the first coarse synchronization message and adjusted the local clock by an estimated time of arrival of the first coarse synchronization message.

11. The method of claim 1, wherein the source node is a first source node and wherein the first node receives a third coarse synchronization message from a second source node that is a different than the first source node, wherein the third coarse synchronization message comprises a second TDMA frame format that is different than the first TDMA frame format, and wherein the first node adopts the second TDMA frame format of the third coarse synchronization message according to a common prioritization scheme.

12. The method of claim 11, wherein the common prioritization scheme dictates that the first node will adopt the second TDMA frame format of the third coarse synchronization message if the second source node has a lower unique identifier than the first source node.

13. The method of claim 1, wherein the fine synchronization message has a time-to-live (TTL) value of one hop.

14. The method of claim 1, wherein the source node is one of the plurality of nodes.

15. A method of synchronizing a time reference in a time-slotted barrage relay network comprising a plurality of nodes, the method comprising:
   at a first node of the plurality of nodes:
      waiting a random amount of time to receive a coarse synchronization message from a source node;
      if the coarse synchronization message is not received, generating a first coarse synchronization message comprising a description of a TDMA frame format;
      transmitting the first coarse synchronization message, wherein the first coarse synchronization message is received by at least one neighboring node of the plurality of nodes, wherein the at least one neighboring node adopts the TDMA frame format of the first coarse synchronization message, wherein the at least one neighboring node does not relay the coarse synchronization message, and wherein the at least one neighboring node achieves coarse synchronization by adjusting a local clock by an estimated time of arrival of the first coarse synchronization message, and thereafter
      transmitting a second coarse synchronization message on a first logical channel that is defined by the TDMA frame format of the first coarse synchronization message, wherein the at least one neighboring node receives the second coarse synchronization message from the first node, wherein the at least one neighboring node relays the second coarse synchronization message to at least one other neighboring node of the plurality of nodes, wherein the at least one neighboring node receives a fine synchronization message comprising time of arrival information on a second logical channel that is defined by the TDMA frame format of the first coarse synchronization message, wherein the at least one neighboring node adjusts the local clock using the time of arrival information of the fine synchronization message, and wherein the relayed second coarse synchronization message and subsequently relayed coarse synchronization messages enable each of the plurality of nodes to achieve coarse synchronization in a time proportional to a hop radius of the time-slotted barrage relay network.

16. A non-transitory tangible computer-readable medium embodying program code executable by a computing system on a first node of a plurality of nodes in a time-slotted barrage relay network, the program code comprising:
   program code for receiving, at the first node, a first coarse synchronization message comprising a description of a TDMA frame format from a source node, wherein the first coarse synchronization message is not relayed by the first node;
   program code for adopting, at the first node, the TDMA frame format of the first coarse synchronization message;
   program code for achieving, at the first node, coarse synchronization by adjusting a local clock by an estimated time of arrival of the first coarse synchronization message;
   program code for receiving, at the first node, a second coarse synchronization message from the source node on a first logical channel that is defined by the TDMA frame format of the first coarse synchronization message;
   program code for relaying, from the first node, the second coarse synchronization message to at least one neighboring node of the plurality of nodes on the first logical channel, wherein the relayed second coarse synchronization message and subsequently relayed coarse synchronization messages enable each of the plurality of nodes to achieve coarse synchronization in a time proportional to a hop radius of the time-slotted barrage relay network;

program code for receiving, at the first node, a fine synchronization message comprising time of arrival information on a second logical channel that is defined by the TDMA frame format of the first coarse synchronization message; and program code for adjusting, at the first node, the local clock using the time of arrival information of the fine synchronization message.

17. The method of claim 16, wherein the fine synchronization message has a time-to-live (TTL) value of one hop.

18. A method of synchronizing a time reference in a time-slotted barrage relay network comprising a plurality of nodes, the method comprising:

performing, by a source node, a coarse synchronization of a first plurality of surrounding nodes of the plurality of nodes, the performing comprising:

transmitting a first coarse synchronization message to the first plurality of surrounding nodes, wherein the first coarse synchronization message comprises a description of a TDMA frame format that is adopted by the first plurality of surrounding nodes, wherein the first plurality of surrounding nodes achieve coarse synchronization by adjusting their respective local clocks to an estimated time of arrival of the first coarse synchronization message, and wherein the first coarse synchronization message is not relayed by the first plurality of surrounding nodes;

transmitting a second coarse synchronization message to the first plurality of surrounding nodes, wherein the first plurality of surrounding nodes relay the second coarse synchronization message to a second plurality of surrounding nodes of the plurality of nodes on a first logical channel once the TDMA frame format is adopted by the first plurality of surrounding nodes, wherein the first logical channel is defined by the TDMA frame format of the first coarse synchronization message from the source node, and wherein the relayed second coarse synchronization message enables each of the second plurality of surrounding nodes to achieve coarse synchronization in a time proportional to a hop radius of the time-slotted barrage relay network; and performing, by at least one of the first plurality of surrounding nodes, a fine synchronization process by receiving a fine synchronization message on a second logical channel and adjusting a local clock according to the time of arrival information contained in the fine synchronization message, wherein the second logical channel is defined by the TDMA frame format of the first coarse synchronization message from the source node.

19. The method of claim 18, wherein the first plurality of surrounding nodes cannot transmit or receive messages on the second logical channel until adopting the TDMA frame format of the first coarse synchronization message.

20. The method of claim 18, wherein the fine synchronization message has a time-to-live (TTL) value of one hop.

* * * * *